United States Patent
Tabata

(10) Patent No.: US 12,031,810 B2
(45) Date of Patent: Jul. 9, 2024

(54) MEASURING DEVICE, INSPECTION DEVICE, AND SURFACE MOUNTER

(71) Applicant: YAMAHA HATSUDOKI KABUSHIKI KAISHA, Iwata (JP)

(72) Inventor: Nobuaki Tabata, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 106 days.

(21) Appl. No.: 17/791,866

(22) PCT Filed: Apr. 16, 2020

(86) PCT No.: PCT/JP2020/016720
§ 371 (c)(1),
(2) Date: Jul. 8, 2022

(87) PCT Pub. No.: WO2021/210128
PCT Pub. Date: Oct. 21, 2021

(65) Prior Publication Data
US 2023/0080582 A1 Mar. 16, 2023

(51) Int. Cl.
*G01B 11/25* (2006.01)
*G01B 11/02* (2006.01)
*G01B 11/06* (2006.01)
*G06T 7/60* (2017.01)

(52) U.S. Cl.
CPC ........ *G01B 11/2527* (2013.01); *G01B 11/022* (2013.01); *G01B 11/0608* (2013.01); *G01B 11/2513* (2013.01); *G06T 7/60* (2013.01)

(58) Field of Classification Search
CPC ............. G01B 11/2527; G01B 11/022; G01B 11/0608; G01B 11/2513; G06T 7/60; G06T 7/521; G06T 7/50
See application file for complete search history.

(56) References Cited

U.S. PATENT DOCUMENTS

2010/0321773 A1* 12/2010 Chen .................. G01B 11/2527
359/386
2014/0368835 A1* 12/2014 Tabata .................. G01B 11/25
356/612

(Continued)

FOREIGN PATENT DOCUMENTS

JP 2005-249684 A 9/2005
JP 2010-281665 A 12/2010

(Continued)

OTHER PUBLICATIONS

International Search Report issued in PCT/JP2020/016720; mailed Jul. 21, 2020.

(Continued)

*Primary Examiner* — John R Schnurr
(74) *Attorney, Agent, or Firm* — Studebaker & Brackett PC

(57) ABSTRACT

A measuring device includes a projector, a camera and a calculation device. The projector projects, on a target object, first stripe pattern light having a first period, second stripe pattern light having a second period, and third stripe pattern light having a third period. A relation of the periods is the first period<the second period<the third period. The camera captures an image of the first stripe pattern light, an image of the second stripe pattern light, and an image of the third stripe pattern light. The calculation device performs a phase analysis of luminance with a phase shifting method for the image of the first stripe pattern light, the image of the second stripe pattern light, and the image of the third stripe pattern light, and calculates a height of the target object based on obtained phase analysis results.

20 Claims, 14 Drawing Sheets

(56) References Cited

U.S. PATENT DOCUMENTS

| | | | | |
|---|---|---|---|---|
| 2021/0123723 A1* | 4/2021 | Yu | .................. | G01B 5/0014 |
| 2022/0221270 A1* | 7/2022 | Zuo | .................. | G01B 11/2513 |
| 2023/0273015 A1* | 8/2023 | Hirose | ............... | G01B 11/2545 |
| | | | | 356/610 |

FOREIGN PATENT DOCUMENTS

| | | |
|---|---|---|
| JP | 2015-001381 A | 1/2015 |
| JP | 5780659 B2 | 9/2015 |
| JP | 2018-146476 A | 9/2018 |
| JP | 2020-038074 A | 3/2020 |

OTHER PUBLICATIONS

An Office Action; "Notice of Reasons for Refusal," mailed by the Japanese Patent Office on May 25, 2023, which corresponds to Japanese Patent Application No. 2022-514948 and is related to U.S. Appl. No. 17/791,866; with English language translation.

An Office Action mailed by China National Intellectual Property Administration on Mar. 16, 2024, which corresponds to Chinese Patent Application No. 202080091443.X and is related to U.S. Appl. No. 17/791,866; with English language translation.

An Office Action mailed by the Korean Intellectual Property Office on Apr. 30, 2024, which corresponds to Korean Patent Application No. 10-2022-7023309 and is related to U.S. Appl. No. 17/791,866; with English language translation.

* cited by examiner

MEASURING DEVICE, INSPECTION DEVICE, AND SURFACE MOUNTER

CROSS-REFERENCE TO RELATED APPLICATION

This application is a National Stage of International Patent Application No. PCT/JP2020/0016720, filed Apr. 16, 2020, the entire content of which is incorporated herein by reference.

BACKGROUND

Technical Field

The technology disclosed herein relates to a measuring device for measuring heights of target objects with a phase shifting method.

Background Art

An example of height measuring methods is a phase shifting method. With the phase shifting method, light of a stripe pattern having luminance that periodically changes is projected on a target object several times with shifting the phase and images of the projected light of the stripe pattern are captured. From the captured images, the phases related to luminance of the pixels are estimated and a height of the target object is measured. Japanese Patent Publication No. 5780659 and Japanese Unexamined Patent Application Publication No. 2018-146476 disclose three-dimensional shape measuring devices using the phase shifting method.

SUMMARY

With the phase shifting method, a stripe pattern light is projected on the target object and the phase values related to the luminance are estimated from the captured image and a height is calculated. As the period of the stripe pattern light to be projected on the target object is shorter, the resolution becomes higher and this increases the accuracy in calculation of height. As the period is longer, the effective depth with reference to a focal plane relevant to the camera increases.

The resolution and the effective depth have a so-called trade-off relation. If the resolution is increased to increase the accuracy in calculation of height with using light of one single stripe pattern, the effective depth decreases. If the effective depth is increased, the resolution decreases and the accuracy in calculation of height is decreased.

The technology described herein was made in view of the above, and performs measurement with high accuracy and great depth with using three types of stripe pattern lights having different periods in a measuring device that measures a height of a target object with using a phase shifting method.

A measuring device includes a projector projecting stripe pattern light having lightness that periodically changes on a target object, a camera capturing an image of the stripe pattern light that is projected on the target object, and a calculation device. The projector projects first stripe pattern light having a first period, second stripe pattern light having a second period, and third stripe pattern light having a third period on the target object, and a relation of the periods is the first period<the second period<the third period. The camera captures an image of the first stripe pattern light, an image of the second stripe pattern light, and an image of the third stripe pattern light each of which is projected on the target object. The calculation device is configured to perform a phase analysis of luminance with a phase shifting method for the image of the first stripe pattern light, the image of the second stripe pattern light, and the image of the third stripe pattern light each of which is captured by the camera and calculate a height of the target object based on obtained phase analysis results.

With the configuration, three types of stripe pattern lights having different periods are used for calculating the height of the target object. The resolution and the effective depth have a trade-off relation. With the stripe pattern light having the first period (a short period), the effective depth is small but the resolution is high. Therefore, the height can be calculated with high accuracy. With the stripe pattern light having the second period (a middle period) and the stripe pattern light having the third period (a long period), the resolution is low but the effective depth is large.

According to the measuring device of one embodiment, the calculation device may be configured to calculate the height of the target object with using a first phase value obtained from the phase analysis of luminance related to the captured image of the first stripe pattern light, a second phase value obtained from the phase analysis of luminance related to the captured image of the second stripe pattern light, and a third phase value obtained from the phase analysis of luminance related to the captured image of the third stripe pattern light, when accuracy in calculation of the height of the target object is high. The calculation device may be configured to calculate the height of the target object with using the second phase value obtained from the phase analysis of luminance related to the captured image of the second stripe pattern light and the third phase value obtained from the phase analysis of luminance related to the captured image of the third stripe pattern light, when accuracy in calculation of the height of the target object is low.

According to the configuration, with using the first phase value, the second phase value, and the third phase value, the height of the target object can be calculated with high accuracy (a small depth). With using the second phase value and the third phase value, the height of the target object can be calculated with low accuracy (a large depth).

According to the measuring device of one embodiment, when the accuracy in calculation of the height of the target object is high, the calculation device may be configured to perform phase unwrapping of the first phase value with reference to a phase difference between the second phase value and the third phase value and calculate the height of the target object based on the first phase value obtained via the phase unwrapping.

With the configuration, the phase unwrapping of the first phase value is performed with reference to a phase change of a long period, which is related to the phase difference between the second phase value and the third phase value. As the phase to be referred to has a longer period, a higher phase degree can be obtained. Therefore, a range of height that can be calculated with high accuracy is increased within the effective depth of the first stripe pattern light.

According to the measuring device of one embodiment, when the accuracy in calculation of the height of the target object is low, the calculation device may be configured to perform phase unwrapping of the second phase value or the third phase value with reference to a phase difference between the second phase value and the third phase value and calculate the height of the target object based on the second phase value or the third phase value obtained via the phase unwrapping.

With the configuration, the phase unwrapping of the second phase value or the third phase value is performed with reference to a phase change of a long period, which is related to the phase difference between the second phase value and the third phase value. As the phase to be referred to has a longer period, a higher phase degree can be obtained. Therefore, a range of height that can be calculated with low accuracy is increased within the effective depth of the second stripe pattern light or the third stripe pattern light.

When the first period is defined as T1, the second period is defined as T2, and the third period is defined as T3, the relations may be 2×T1≤T2, T2≤T3≤1.5×T2.

With such a configuration, a ratio of the third period to the second period is 1 to 1.5 and long phase change can be obtained based on the phase difference between the second phase value and the third phase value. This is preferably used as a reference phase used for the phase unwrapping.

The calculation device may be configured to determine the accuracy in calculation of the height of the target object between the high accuracy and the low accuracy based on the analysis result related to the captured image of the second stripe pattern light and the captured image of the third stripe pattern light.

With the configuration, the accuracy in calculation of the height of the target object can be selected with using the analysis result related to the stripe pattern light that is projected on the target object.

When the calculation device selects the low accuracy and calculates the height of the target object with using the second phase value and the third phase value and a calculated height of the target object is equal to or smaller than a height threshold, the calculation device may be configured to select the high accuracy and calculate the height of the target object with using the first phase value, the second phase value, and the third phase value.

With the configuration, when the calculated height of the target object is equal to or smaller than the height threshold (when the target object is within a range near the focal plane surface), the height can be calculated with high accuracy.

The calculation device may be configured to perform the phase unwrapping of the second phase value or the third phase value with using a phase difference between the second phase value and the third phase value. When the second phase value obtained via the phase unwrapping or the third phase value obtained via the phase unwrapping is equal to or smaller than a phase threshold, the calculation device may be configured to select the high accuracy and calculate the height of the target object with using the first phase value, the second phase value, and the third phase value. When the second phase value obtained via the phase unwrapping or the third phase value obtained via the phase unwrapping is greater than the phase threshold, the calculation device may be configured to select the low accuracy and calculate the height of the target object with using the second phase value and the third phase value.

With the configuration, when the second phase value or the third phase value is equal to or smaller than the phase threshold (when the target object is within a range near the focal plane surface), the height can be calculated with high accuracy. When the second phase value or the third phase value is greater than the phase threshold (when the target object is far away from the focal plane surface), the height can be calculated with low accuracy.

The calculation device may be configured to analyze power of luminance for each of the image of the first stripe pattern, the image of the second stripe pattern light, and the image of the third stripe pattern light that are captured by the camera, in addition to the phase analysis. When the power of luminance of the captured image of the first stripe pattern light is equal to or greater than a luminance threshold, the calculation device may be configured to perform the high accuracy calculation process in the calculation process.

With the configuration, when the power of luminance of the captured image of the stripe pattern light having the first period is greater than the threshold (the power is within a range that can provide a contrast required for the phase analysis of the stripe pattern having the first period), the height of the target object can be calculated with high accuracy.

When the power of luminance of the captured image of the first stripe pattern light is smaller than the luminance threshold, the calculation device may be configured to compare each of the powers of luminance of the two captured images of the second stripe pattern light and the third stripe pattern light with the luminance threshold. When the powers of two captured images are equal to or greater than the luminance threshold, the calculation device may perform the low accuracy process in the calculation process.

With the configuration, when the power of luminance of the captured image of the stripe pattern light having the second period or the stripe pattern having the third period is greater than the threshold (the power is within a range that can provide a contrast required for the phase analysis of the stripe pattern having the second period, the third period), the height of the target object can be calculated with low accuracy.

The measuring device may be used for a surface mounter that mounts electronic components on printed circuit boards and may be used for an inspection device for inspecting printed circuit boards. The measuring device may be used for other usages or other devices.

According to the technology disclosed herein, in a measuring device of measuring a height of a target object with using a phase shifting method, measurement with high accuracy and great depth can be performed with using three types of stripe pattern lights having different periods.

DETAILED DESCRIPTION

Embodiment 1

1. Description of Measuring Device 1

Figure 1:
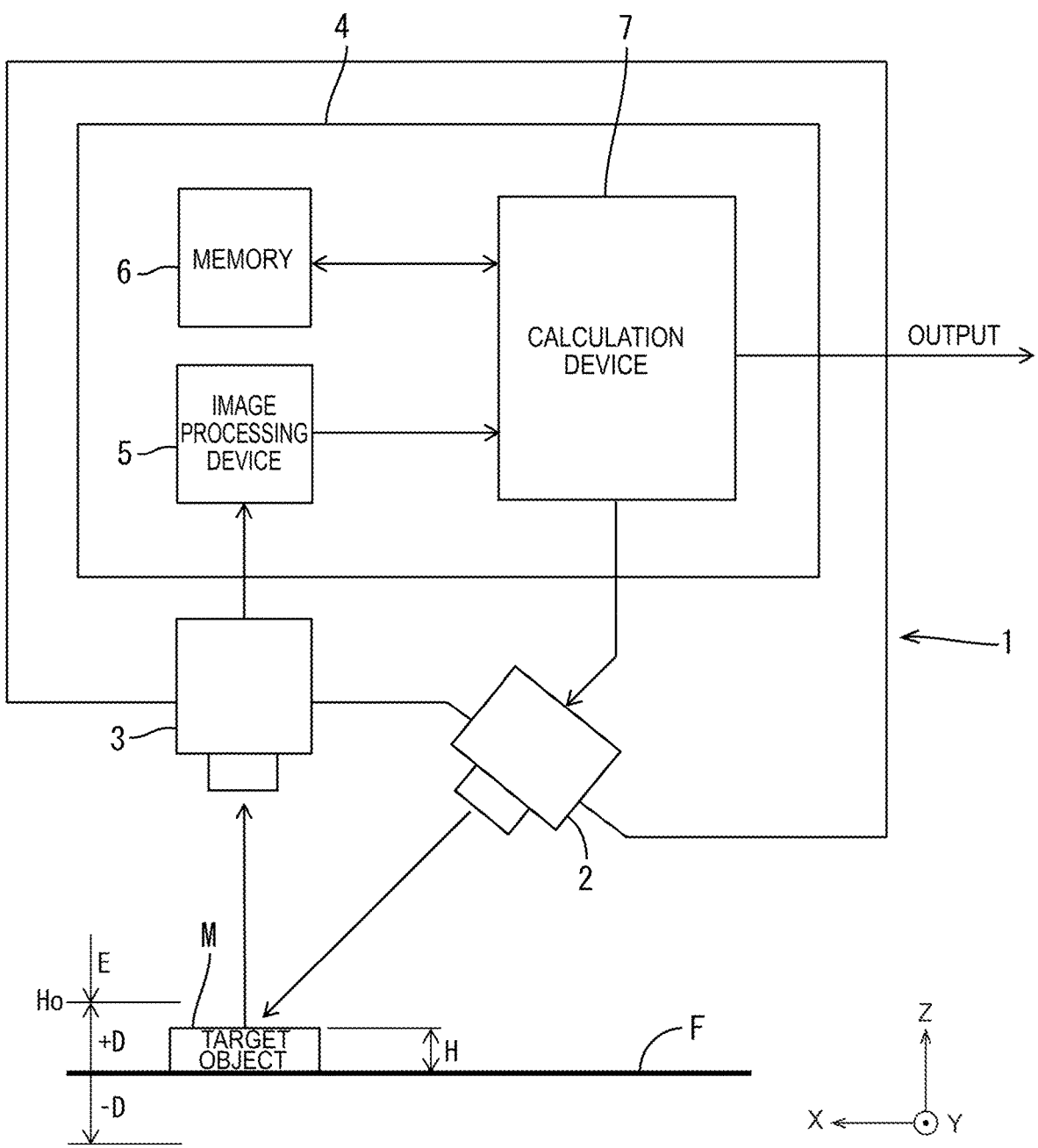
FIG. 1 is a block diagram illustrating a measuring device.

As illustrated in FIG. 1, a measuring device 1 includes a projector 2, a camera 3, and a data processing unit 4.

Figure 2:
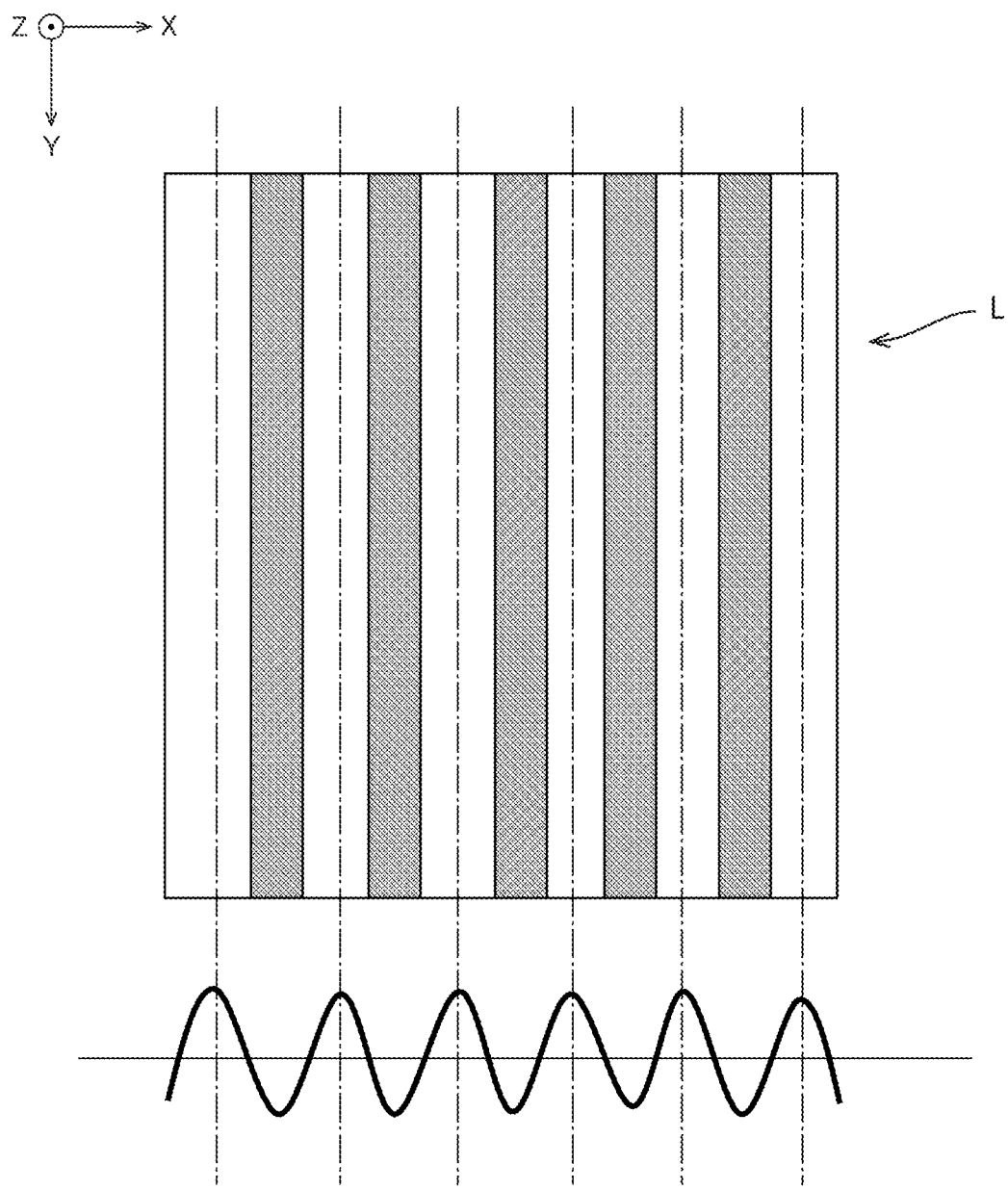
FIG. 2 illustrates a stripe pattern.

The measuring device 1 measures a target object M. The projector 2 of the measuring device 1 is above the target object M and arranged such that detection light is projected on the target object M from an obliquely upper side. As illustrated in FIG. 2, the detection light is stripe pattern light L having lightness that periodically changes. An example of the stripe pattern light L is sinusoidal wave pattern light and lightness of such light changes in a form of a sinusoidal wave. The sinusoidal wave in FIG. 2 describes change in lightness of the stripe pattern light L.

The camera 3 is disposed above the target object M such that an image capturing surface faces downward. The camera 3 captures an image of the stripe pattern light L projected on the target object M.

Figure 3:
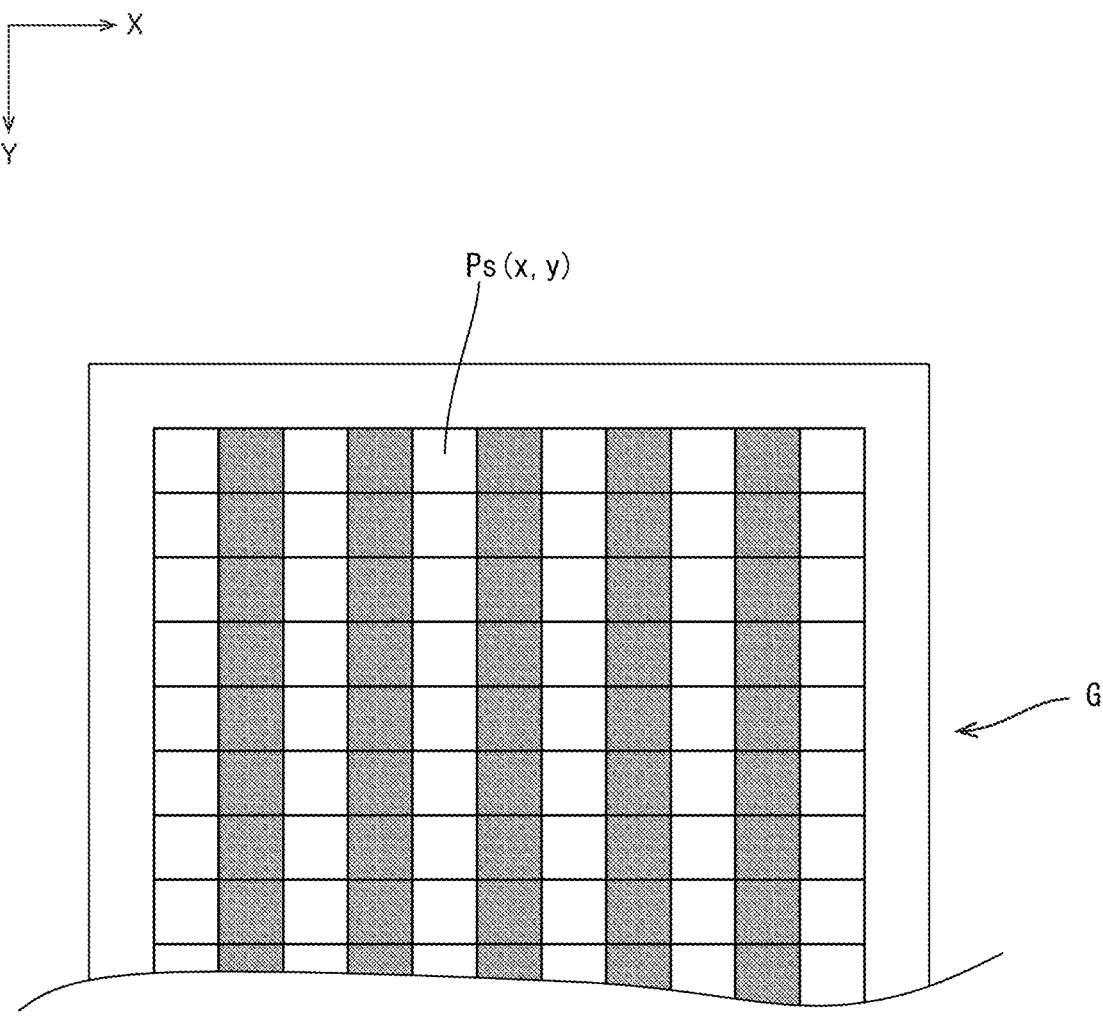
FIG. 3 illustrates an image.

The data processing unit 4 includes an image processing device 5, a memory 6, and a calculation device 7. The image processing device 5 receives data of an image G from the camera 3. The image processing device 5 processes the data of the image G and calculates luminance I of each pixel Ps (refer to FIG. 3).

The calculation device 7 calculates a phase value φ related to the luminance I based on the data of the luminance I of the pixel Ps transmitted from the image processing device 5. The calculation device 7 calculates a height H of the target object M based on the calculated phase value cp. The height H is a distance from a reference surface F with respect to a Z-direction. The calculation device 7 calculates the phase values φ with using the phase shifting method.

2. Measurement Principle of Phase Shifting Method

The phase shifting method is a method of projecting the stripe pattern light L on the target object M and capturing images of the projected stripe pattern light L several times with shifting the phase of the stripe pattern light L and estimating the phase values φ from the luminance I of the captured images G.

The luminance I (x, y) of each pixel Ps of the captured image G of the stripe pattern light L is expressed by a formula 1. The stripe pattern light has a form of a sinusoidal wave and x, y depict a position (a coordinate) of each pixel Ps.

$$I(x,y)=a(x,y)\cos(\varphi(x,y)+\alpha)+b(x,y) \quad \text{[Formula 1]}$$

In the formula 1, a denotes a luminance amplitude, φ denotes a phase value, and b denotes background luminance.

When the shift amounts α of the stripe pattern lights L are 0, π/2, π, (3/2)π, the luminance I0 to I3 of the pixels Ps relevant to the stripe pattern lights L with the phase being shifted are expressed by the following formulas 2. The direction in which the stripe pattern lights L are shifted is a direction along the waveform, that is, a X-direction in FIG. 2.

$$I0=a(x,y)\cos(\varphi(x,y))+b(x,y)$$

$$I1=a(x,y)\cos(\varphi(x,y)+\pi/2)+b(x,y)$$

$$I2=a(x,y)\cos(\varphi(x,y)+\pi)+b(x,y)$$

$$I3=a(x,y)\cos(\varphi(x,y)+3\pi/2)+b(x,y) \quad \text{[Formulas 2]}$$

Figure 4:
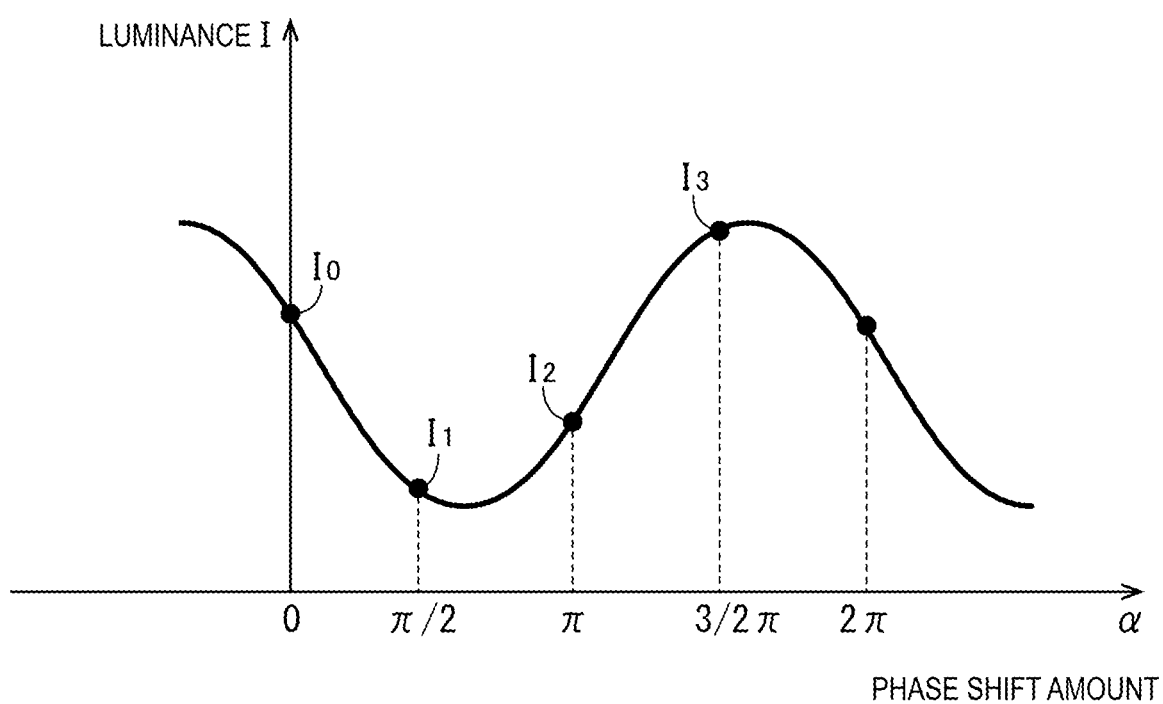
FIG. 4 illustrates a relation between luminance and shift amounts.
Figure 5:
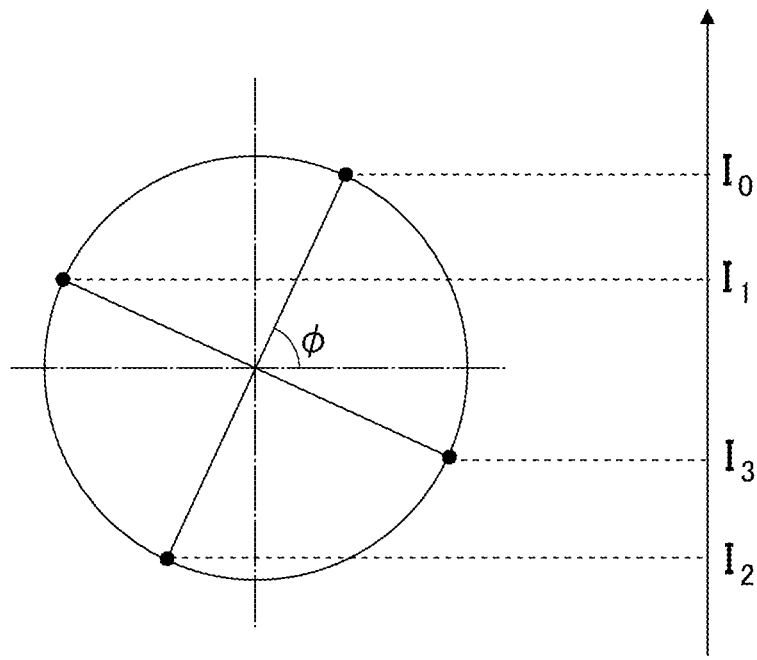
FIG. 5 illustrates a relation between luminance and phases.

With reference to the formulas 2, the phase value φ related to the luminance I0 of the stripe pattern light L, which is a target to be measured, is expressed by the following formula 3. Power P of the luminance I0 is expressed by the following formula 4 (refer to FIGS. 4 and 5).

$$\varphi = \arctan\left(\frac{I2-I0}{I3-I1}\right) \quad \text{[Formula 3]}$$

-continued $$P = \sqrt{(I2-I0)^2 + (I3-I1)^2} \quad \text{[Formula 4]}$$

Because the phase value φ is related to the height H of the target object M, the height H(φ) of the target object M can be estimated by estimating the phase values φ related to the respective pixels Ps. For example, data related to the phase values φ and the height H of the target object M are previously obtained as reference data to create a reference table and the reference table is stored in the memory 6. The height H(φ) of the target object M can be obtained with using the reference table.

In the above description, the variation of the shift amount α includes 0, π/2, π, and (3/2)π; however, at least three different phases are enough for estimating the phase value cp. The variation of the shift amount α may include 0, 2π/3, and 4π/3.

3. Phase Unwrapping

If the phase value φ is between −π and π inclusive, the value of H(φ) is limited to be within a range from H(−π) to H(π) inclusive. One of the methods of increasing the range of the height H that can be calculated is a phase unwrapping method. The phase unwrapping method is a method of specifying a phase degree k related to the phase value tri with using a reference phase.

Figure 6:
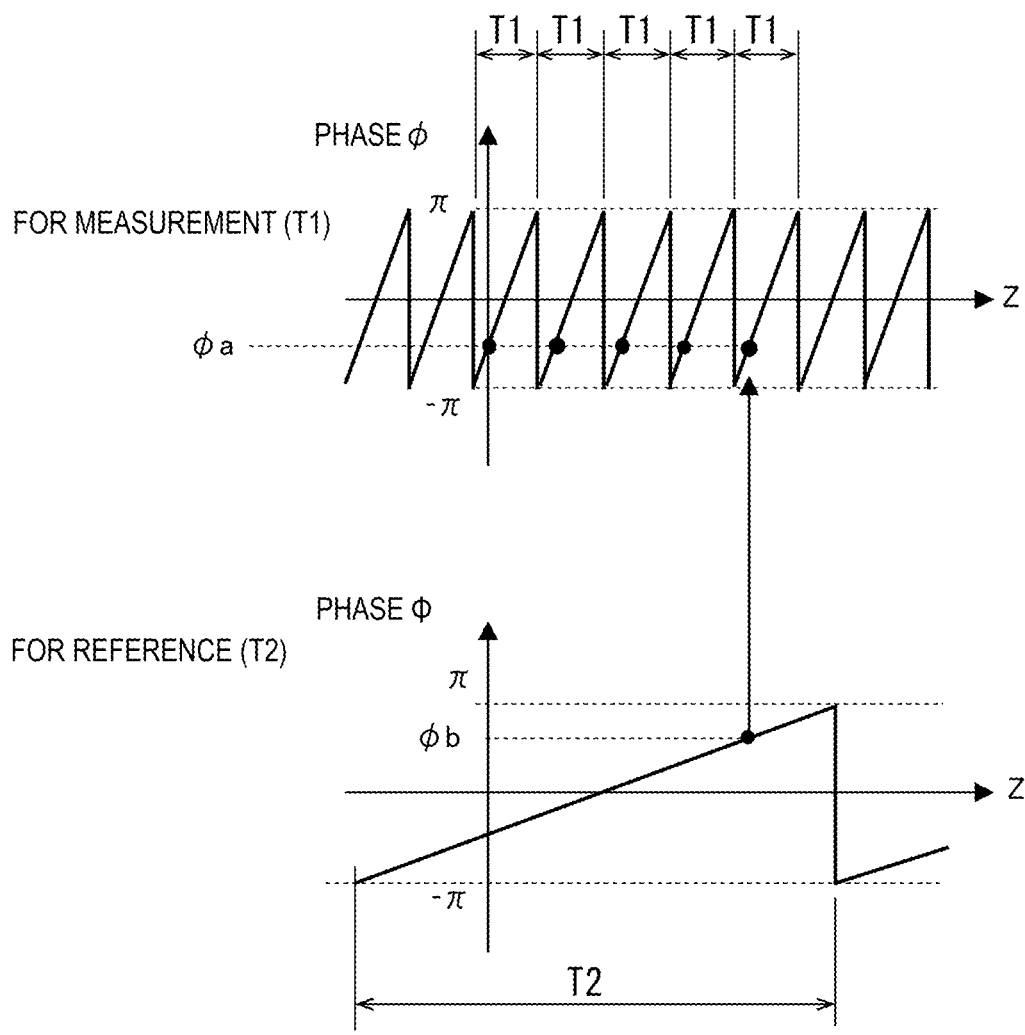
FIG. 6 is a diagram for describing a phase unwrapping method.

FIG. 6 illustrates the phase unwrapping that is performed with using light of high frequency fringes with a period T1 as measurement stripe pattern light and using light of low frequency fringes with a period T2 (T1<T2) as reference stripe pattern light. φa denotes a phase value of the measurement stripe pattern light (T1) and φb denotes a phase value of the reference stripe pattern light (T2).

In the example in FIG. 6, the reference phase value φb corresponds to the phase value φa at the fifth period. Therefore, the phase degree k of the phase value φa is 5.

$$\varphi'=\varphi\pm 2\pi(k-1) \quad \text{[Formula 5]}$$

φ' denotes a phase value after the phase unwrapping and φ denotes a phase value that is obtained through the analysis with the phase shifting method.

As previously described, with using the reference phase, the phase degree k of the phase value φ can be specified and the range of the phase value φa can be increased from the range from −π to π. Accordingly, a range of H(φ) that can be calculated is increased.

4. Resolution and Effective Depth

Figure 7:
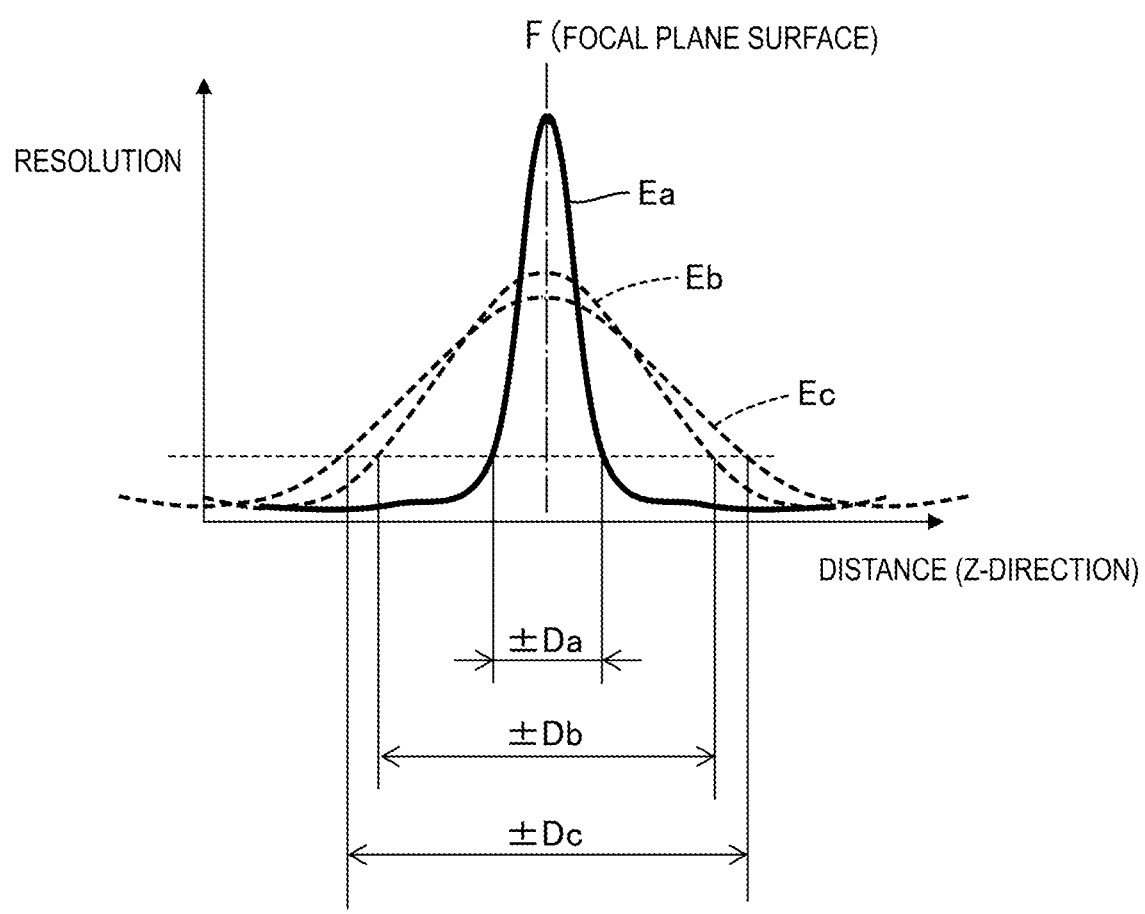
FIG. 7 is a diagram illustrating a relation between resolution and effective depth.

FIG. 7 illustrates a relation between the resolution and the effective depth with respect to the calculation of a height with the phase shifting method. The resolution is a smallest pitch that can be calculated. The effective depth D is a Z-direction range (a distance from the reference surface F) where an image G with an effective contrast can be obtained. The reference surface F is a surface (a focal plane) where the camera 3 has a perfect focus. The Z-direction is a height direction (an upper-bottom direction in FIG. 1).

E is a characteristic curve representing the relation between the resolution and the effective depth. Ea is a characteristic curve relative to the stripe pattern light having the period Ta, Eb is a characteristic curve relative to the stripe pattern light having the period Tb, and Ec is a characteristic curve relative to the stripe pattern light having the period Tc. Da-Dc represent the effective depths. The relation of the periods is Ta<Tb<Tc.

The resolution becomes higher as the period T is shorter and the effective depth becomes larger as the period T is longer. The resolution and the effective depth have a trade-off relation and it is demanded to obtain high resolution and large effective depth.

Figure 8:
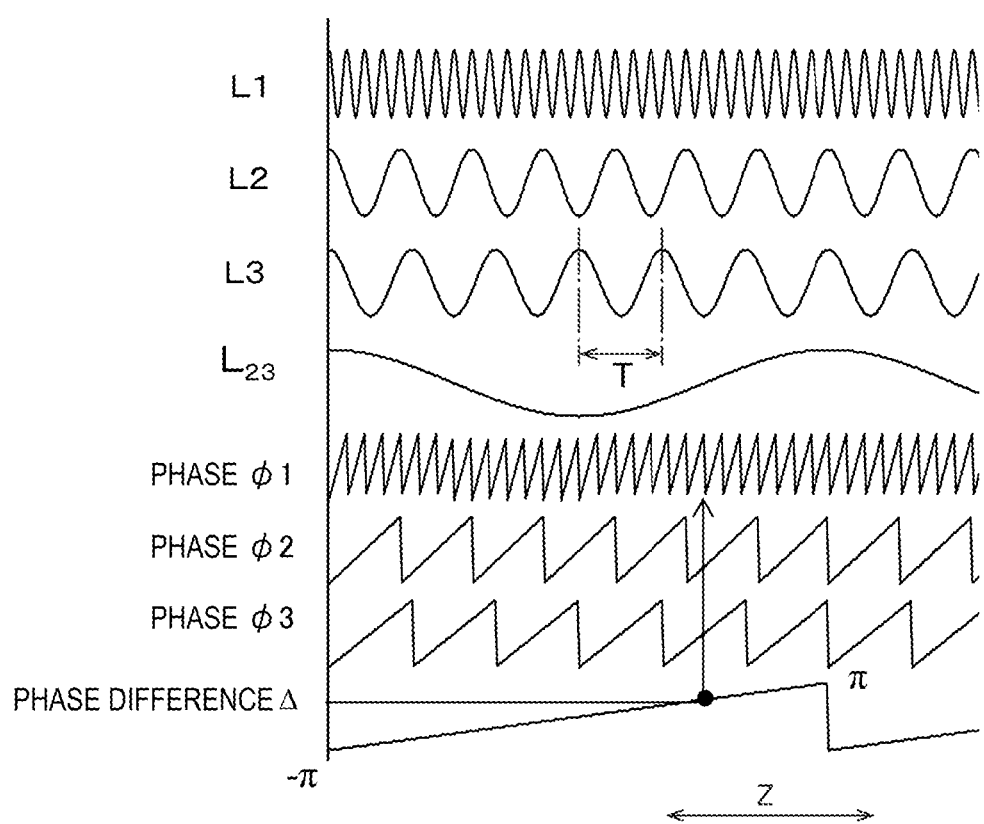
FIG. 8 is a diagram illustrating waves and phase values.

The measuring device 1 projects three types of stripe pattern lights L1-L3 having different periods T on the target object M (refer to FIG. 8).

With the stripe pattern light L1 having a short period, the effective depth D is small; however, the resolution is high and the height H can be calculated with high accuracy. With the stripe pattern light L2 having a middle period and the stripe pattern light L3 having a long period, the resolution is low and the accuracy is low; however, the effective depth D is large. Therefore, the measurement with high accuracy and large depth can be performed and high accuracy in calculation of the height H and a large effective depth can be obtained.

Hereinafter, the method of calculating the height of the target object M will be described in detail with reference to FIG. 9.

Figure 9:
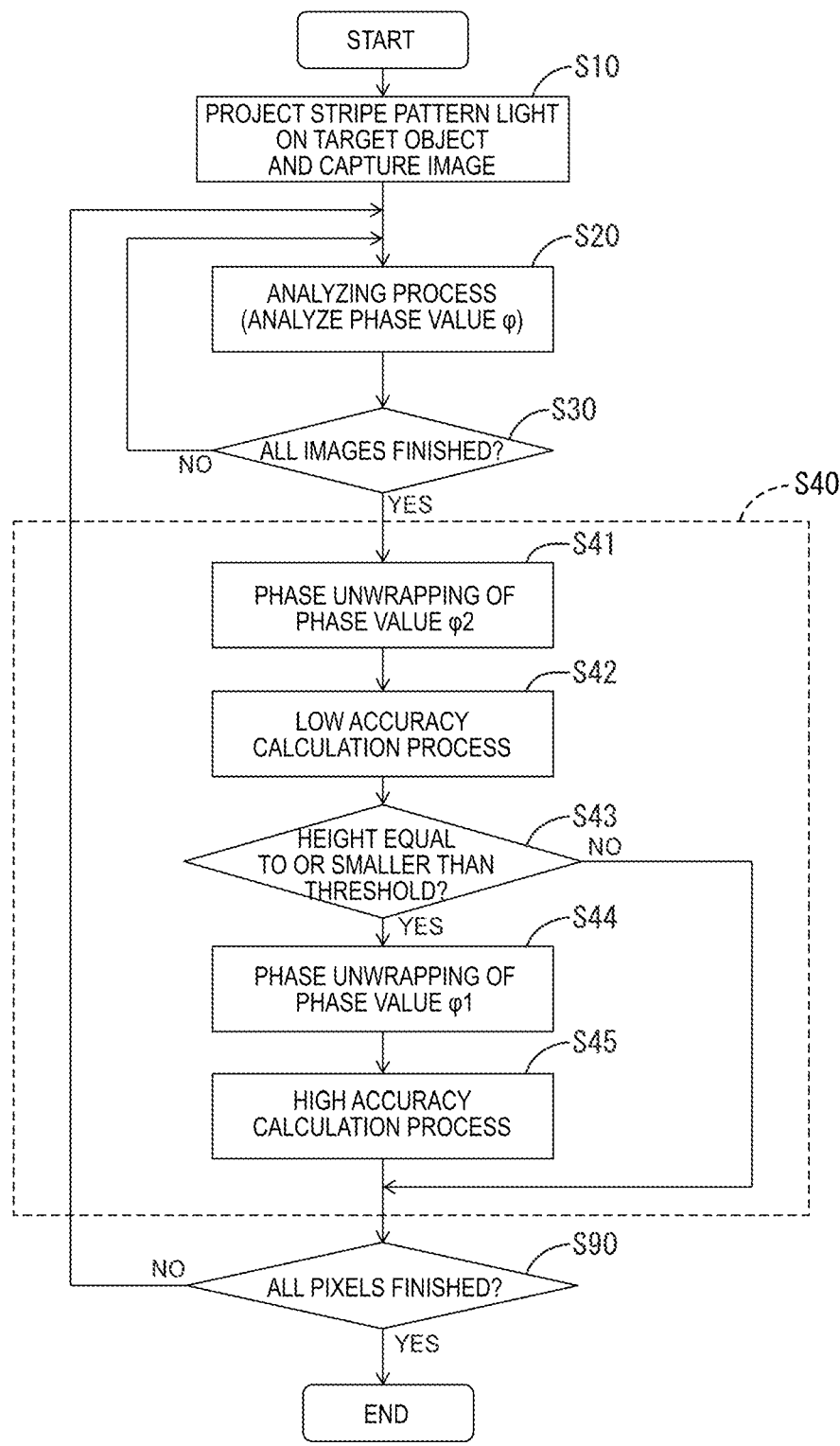
FIG. 9 illustrates a calculation sequence.

A calculation sequence illustrated in FIG. 9 includes five steps S10, S20, S30, S40, and S90.

In step S10, an image capturing process is performed. Specifically, the projector 2 projects the stripe pattern light L on the target object M and the camera 3 captures an image of the stripe pattern light L projected on the target object M. The stripe pattern light includes three types of stripe patterns L1-L3 and images are captured while the stripe pattern light being switched sequentially between the three types of stripe pattern lights L1-L3.

The measuring device 1 calculates phases related to the luminance I with using the phase shifting method. Therefore, an image of each of the stripe pattern lights L1-L3 is captured four times while the phase being shifted with the shift amount α of π/2.

As illustrated in FIG. 8, the three types of stripe pattern lights L1-L3 have different periods T1-T3, respectively. The relation of the periods is T1<T2<T3 and a first period T1 of the first stripe pattern light L1 is shortest. A difference between a second period T2 of the second stripe pattern light L2 and a third period T3 of the third stripe pattern light L3 is very small. By synthesizing the stripe pattern light L2 and the stripe pattern light L3, stripe pattern light $L_{23}$ having a long period is obtained. The relation of wavelengths λ is λ1<λ2<λ3.

In step S20, the captured image G is analyzed by the image processing device 5 and the calculation device 7. Specifically, the image processing device 5 extracts one pixel Ps from the captured image G and calculates a luminance value I. The calculation device 7 estimates a phase value φ related to the luminance I with using the phase shifting method.

In step S30, the calculation device 7 determines whether the calculation of the phase values φ is finished for all of the images G. If all of the images G that are captured in step S10 are not analyzed, the process returns to step S10 and a pixel Ps at the same position is extracted from the image G that is not analyzed yet and the image G is analyzed.

By performing the process of step S20 repeatedly, three phase values φ1-φ3 are calculated for the pixel Ps at the same position of each of the images G of the respective stripe pattern lights L1-L3 captured in step S10.

The first phase value φ1 is a phase value related to the luminance I of the first stripe pattern light L1. The second phase value φ2 is a phase value related to the luminance I of the second stripe pattern light L2. The third phase value φ3 is a phase value related to the luminance I of the third stripe pattern light L3.

When the analyzing process is finished for all of the images G, it is determined YES in step S30 and the process proceeds to step S40.

In step S40, a calculation process is performed by the calculation device 7. In the calculation process, the height H of the target object M is calculated based on the results of the phase analyzation performed in step S20. The calculation process includes five steps S41-S45.

In step S41, the phase unwrapping of the second phase value φ2 is performed with using the second phase value φ2 and the third phase value φ3 out of the three phase values φ1-φ3.

Specifically, as illustrated in FIG. 8, a phase difference Δ between the second phase value φ2 and the third phase value φ3 is obtained. The phase difference Δ=φ2−φ3.

With reference to the calculated phase difference Δ, the phase unwrapping of the second phase value φ2 is performed. As a difference between the two periods T2 and T3 is smaller, the obtained period T is longer. Therefore, a higher phase degree k of the second phase value φ2 can be obtained and a range of H(φ) that can be calculated is increased.

A synthesized wave obtained by synthesizing two waves having different periods T has no waveform deformation compared to a single wave and a sinusoidal wave having high accuracy can be obtained. With using such a synthesized wave, the accuracy in measurement is high.

Next, in step S42, a low accuracy calculation process is performed by the calculation device 7. Specifically, a process of calculating a height $H_2(\varphi)$ of the target object M is performed based on a second phase value φ'2 obtained via the phase unwrapping. The height $H_2(\varphi)$ of the target object M is stored in the memory 6 as a calculation result. $H_2(\varphi)$ is calculated based on the second phase value φ2 having a lower resolution compared to the first phase value φ1. Therefore, the accuracy in calculation of $H_2(\varphi)$ is lower than the accuracy in calculation of $H_1(\varphi)$.

Next, in step S43, the height $H_2(\varphi)$ of the target object M is compared with a height threshold $H_O$. The height threshold $H_O$ is used for determining whether the target object M is within the effective depth D1 related to the first stripe pattern light L1. "E" in FIG. 1 denotes outside the effective depth.

If the height $H_2(\varphi)$ of the target object M is equal to or smaller than the height threshold $H_O$ (within the effective depth), the process proceeds to step S44. In step S44, the phase unwrapping of the first phase value φ1 is performed with using the second phase value φ'2 that is obtained via the phase unwrapping in step S41. Then, the process proceeds to step S45.

In step S45, a high accuracy calculation process is performed by the calculation device 7. Specifically, a process of calculating a height $H_1(\varphi)$ of the target object M is performed based on a first phase value φ'1 obtained via the phase unwrapping.

If the high accuracy calculation process of step S45 is performed, the estimation result that is $H_2(\varphi)$ calculated in step S42 and stored in the memory 6 is overwritten and the height $H_1(\varphi)$ that is calculated in step S45 is stored. Overwriting is replacing data with another data. $H_1(\varphi)$ is calculated based on the first phase value φ1 that has higher resolution than the resolutions of the second phase value φ2 and the third phase value φ3. Therefore, the accuracy in calculation of $H_1(\varphi)$ is higher than the accuracy in calculation of $H_2(\varphi)$.

If the height $H_2(\varphi)$ of the target object M is greater than the height threshold $H_O$ (outside the effective depth), the processes of steps S44 and S45 are not performed and the value calculated in step S42 remains as the calculation result.

In step S90, it is determined whether the analyzing is finished for all the pixels Ps by the calculation device 7. If the analyzing is not finished for all the pixels Ps, the process moves back to step S20 and the next pixel Ps is extracted and the analyzing process is performed.

Such processes are performed for every pixel Ps and a height $H(\varphi)$ at every target point of the target object M is calculated. If the calculation is finished for all the target points (all the pixels Ps), it is determined YES in step S90 and a series of processes is terminated.

As described above, the calculation process S40 includes the high accuracy calculation process S45 and the low accuracy calculation process S42. The high accuracy calculation process S35 is performed for a range near the focal plane surface F (a small depth range) and the height $H_1(\varphi)$ with a high accuracy is obtained. The low accuracy calculation process S42 is performed for a range far away from the focal plane surface F (a great depth range) and the height $H_2(\varphi)$ with a low accuracy is obtained. Accordingly, the height $H(\varphi)$ of the target object M in the range far away from the focal plane surface F (the great depth range) can be calculated and also the height $H(\varphi)$ of the target object M in the range near the focal plane surface F (the small depth range) can be calculated with a high accuracy.

The phase unwrapping of the first phase value φ1 is performed in step S44. Therefore, a range of $H_1(\varphi)$ that can be calculated is increased within the range of the effective depth D1 related to the first stripe pattern light L1.

The phase unwrapping of the second phase value φ2 is performed in step S41. Therefore, a range of $H_2(\varphi)$ that can be calculated is increased within the range of the effective depth D2 related to the second stripe pattern light L2.

Figure 10:
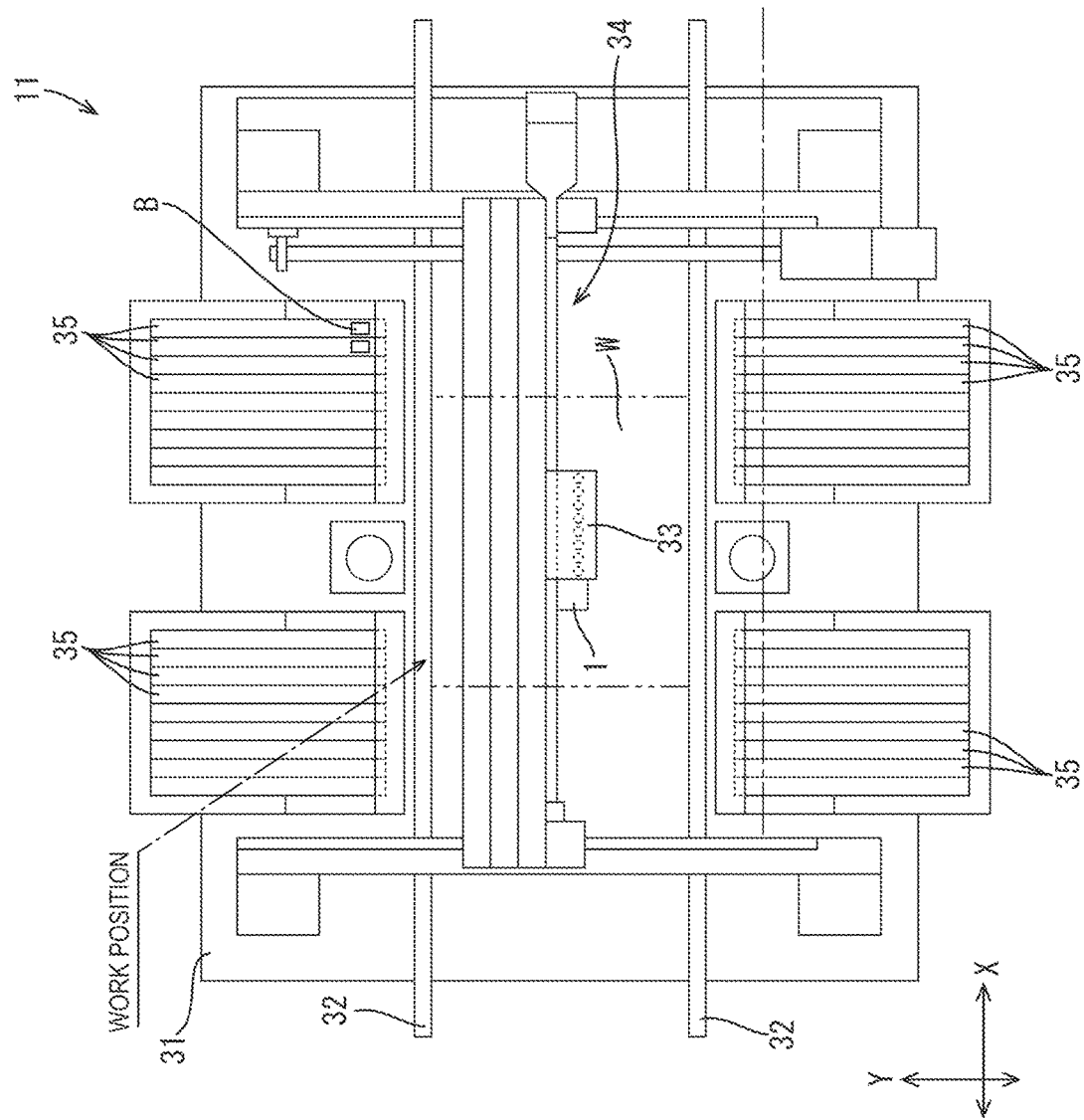
FIG. 10 is a plan view of a surface mounter.

FIG. 10 is a plan view of a surface mounter 11 including the measuring device 1. The surface mounter 11 includes the measuring device 1, a stage 31, conveyers 32, a head unit 33, a driving unit 34, and feeders 35. The conveyers 32 convey a printed circuit board W, to which operations are performed, in a X-direction on the stage 31.

The driving unit 34 moves the head unit 33 along a planar surface direction (a X-Y direction).

The driving unit 34 may include a motor as a driving source and a ball screw mechanism including two or three shafts. The feeders 35 feed electronic components B that are to be mounted on the printed circuit board W.

Figure 11:
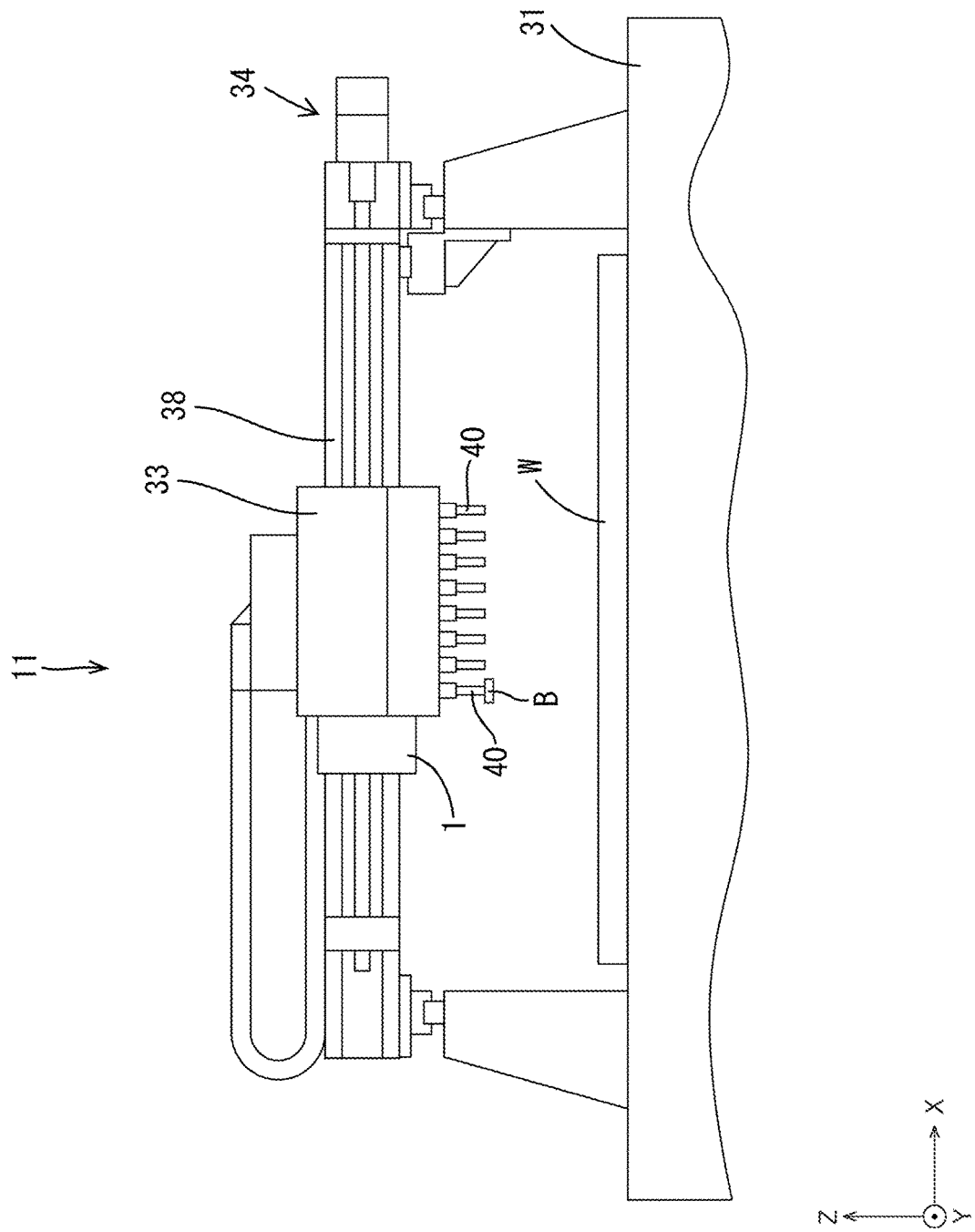
FIG. 11 is a support structure of a head unit.

As illustrated in FIG. 11, the head unit 33 is slidably supported by a support member 38 and includes mounting heads 40.

The mounting heads 40 are supported by the head unit 33 so as to be movable up and down. The mounting heads 40 suck and hold the electronic components B with negative pressure.

The head unit 33 and the mounting heads 40 are for mounting the electronic components B, which are fed from the feeders 35, on the printed circuit board W at a work position that is at a middle of the stage.

As illustrated in FIG. 11, the measuring device 1 is installed in the head unit 33. The measuring device 11 is disposed such that an image capturing surface faces downward and captures an image of the printed circuit board W.

The measuring device 1 measures heights of the points of the printed circuit board W or a height of the electronic component E mounted on the printed circuit board W based on the captured image G.

Based on the measurement results, a condition of the printed circuit board W can be inspected. For example, it can be inspected whether the printed circuit board W is warped and whether mounting of the electronic components E is good. Thus, the measuring device 1 can be used for inspection of the printed circuit boards W.

Second Embodiment

Figure 12:
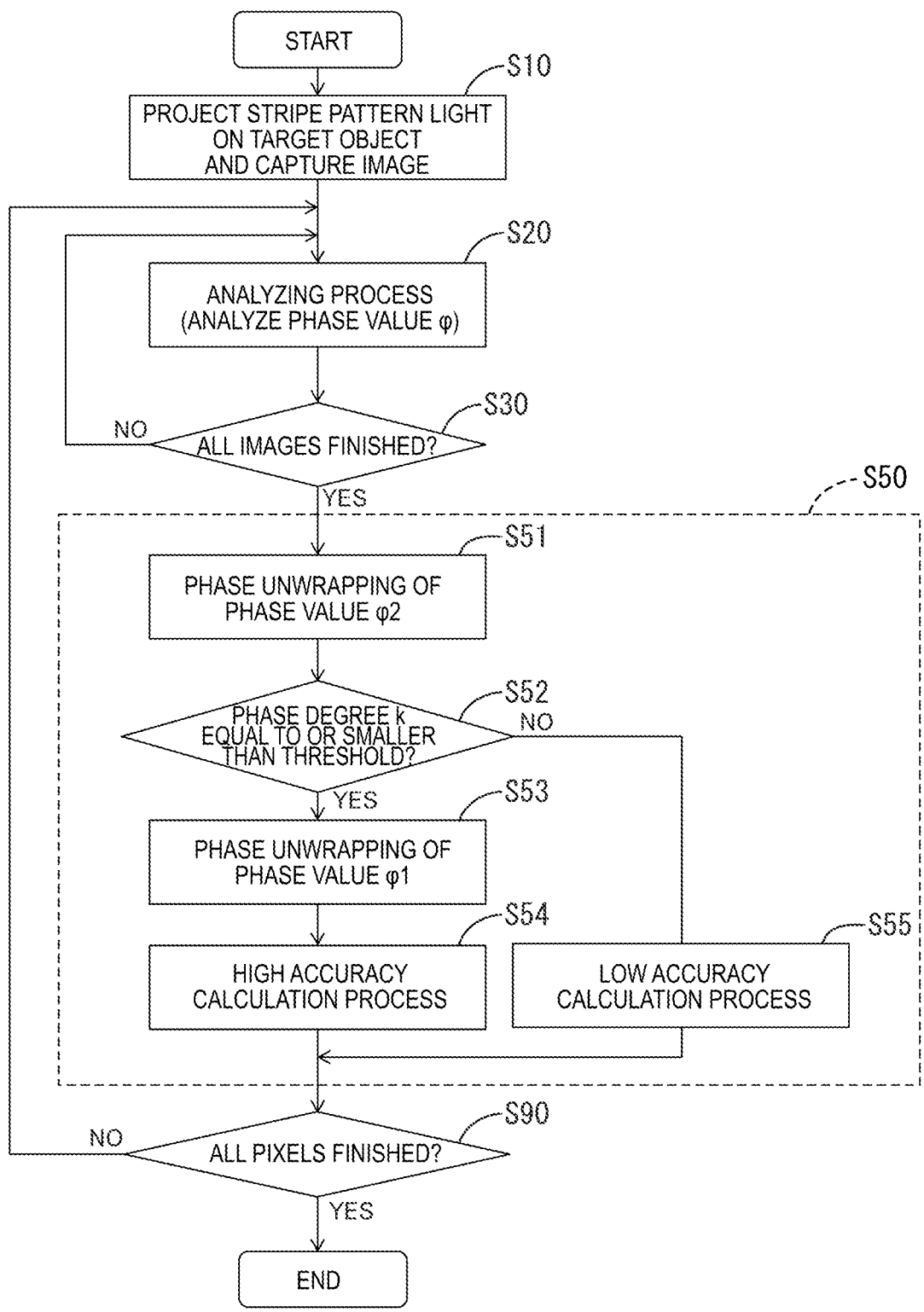
FIG. 12 illustrates a calculation sequence.

FIG. 12 is a flowchart of a calculation sequence. The calculation sequence according to a second embodiment includes five steps S10, S20, S30, S50, and S90 and differs from the calculation sequence according to the first embodiment in the calculation process of step S50.

In steps S10-S30, similar to the processes in the first embodiment, the projector 2 projects the three types of stripe pattern lights L1-L3 on the target object M and the camera 3 captures the images of the lights. Then, one pixel Ps at the same position is extracted from each of the captured images G of the stripe pattern lights L1-L3 and the phase values φ1-φ3 related to the luminance I of each pixel Ps are analyzed. If the analyzing process is finished, the process proceeds to step S50 and the calculation process is performed.

The calculation process includes five steps S51-S55.

In step S51, the phase unwrapping of the second phase value φ2 is performed with using the second phase value φ2 and the third phase value φ3 out of the three phase values φ1-0.

In step S52, the phase degree k of the second phase value φ2 is compared with a degree threshold $k_O$ and it is determined whether the phase degree k is equal to or smaller than the degree threshold $k_O$. The degree threshold $k_O$ is used for determining whether the target object M is within the effective depth D1 related to the first stripe pattern light L1 and is a value that is converted into a phase degree from the height threshold $H_O$.

If the phase degree k is equal to or smaller than the degree threshold $k_O$ (S52: YES), the process proceeds to step S53. In step S53, the calculation device 7 performs the phase unwrapping of the first phase value φ1 with using the second phase value φ2 that is obtained via the phase unwrapping in step S51. Then, the process proceeds to step S54.

In step S54, the high accuracy calculation process is performed by the calculation device 7. In the high accuracy calculation process, the height $H_1(\varphi)$ of the target object M is calculated based on the first phase value φ1 obtained via the phase unwrapping.

If the phase degree k is greater than the degree threshold $k_O$ (S52: NO), the process proceeds to step S55. In step S55, the calculation device 7 performs the low accuracy calculation process. In the low accuracy calculation process, the height $H_2(\varphi)$ of the target object M is calculated based on the second phase value φ'2 that is obtained via the phase unwrapping in SM.

In step S90, it is determined whether the analyzing is finished for all the pixels Ps. If the analyzing is not finished for all the pixels Ps, the process moves back to step S20 and the next pixel Ps is extracted and the analyzing process is performed.

Such processes are performed for every pixel Ps and heights H(φ) are estimated at all the target points. Then, it is determined YES in step S90 and a series of processes is terminated.

Similar to the first embodiment, the calculation process S50 according to the second embodiment includes the high accuracy calculation process S54 and the low accuracy calculation process S55. The high accuracy calculation process S54 is performed for the range near the focal plane surface F (the small depth range) and the height $H_1(φ)$ with a high accuracy is obtained. The low accuracy calculation process S5 is performed for the range far away from the focal plane surface F (the great depth range) and the height $H_2(φ)$ with a low accuracy is obtained. Accordingly, the height H(φ) of the target object M in the range far away from the focal plane surface F (the great depth range) can be calculated and also the height H(φ) of the target object M in the range near the focal plane surface F (the small depth range) can be calculated with a high accuracy.

In the second embodiment, by comparing the phase degree k of the second phase value φ'2 with the degree threshold $k_O$ in step S52, it is determined which one of the high accuracy calculation process (S54) and the low accuracy calculation process (S55) is to be performed. Other than this, such determination may be made by comparing the second phase value φ'2 obtained via the phase unwrapping with the phase threshold $φ_O$ The phase threshold $φ_O$ is a phase value corresponding to the height threshold $H_O$.

With using the second phase value φ'2 for the determination, the determination with high accuracy can be made. With using the phase degree k for the determination, the comparison can be easily made and calculation load is small since the degree is an integer.

Third Embodiment

Figure 13:
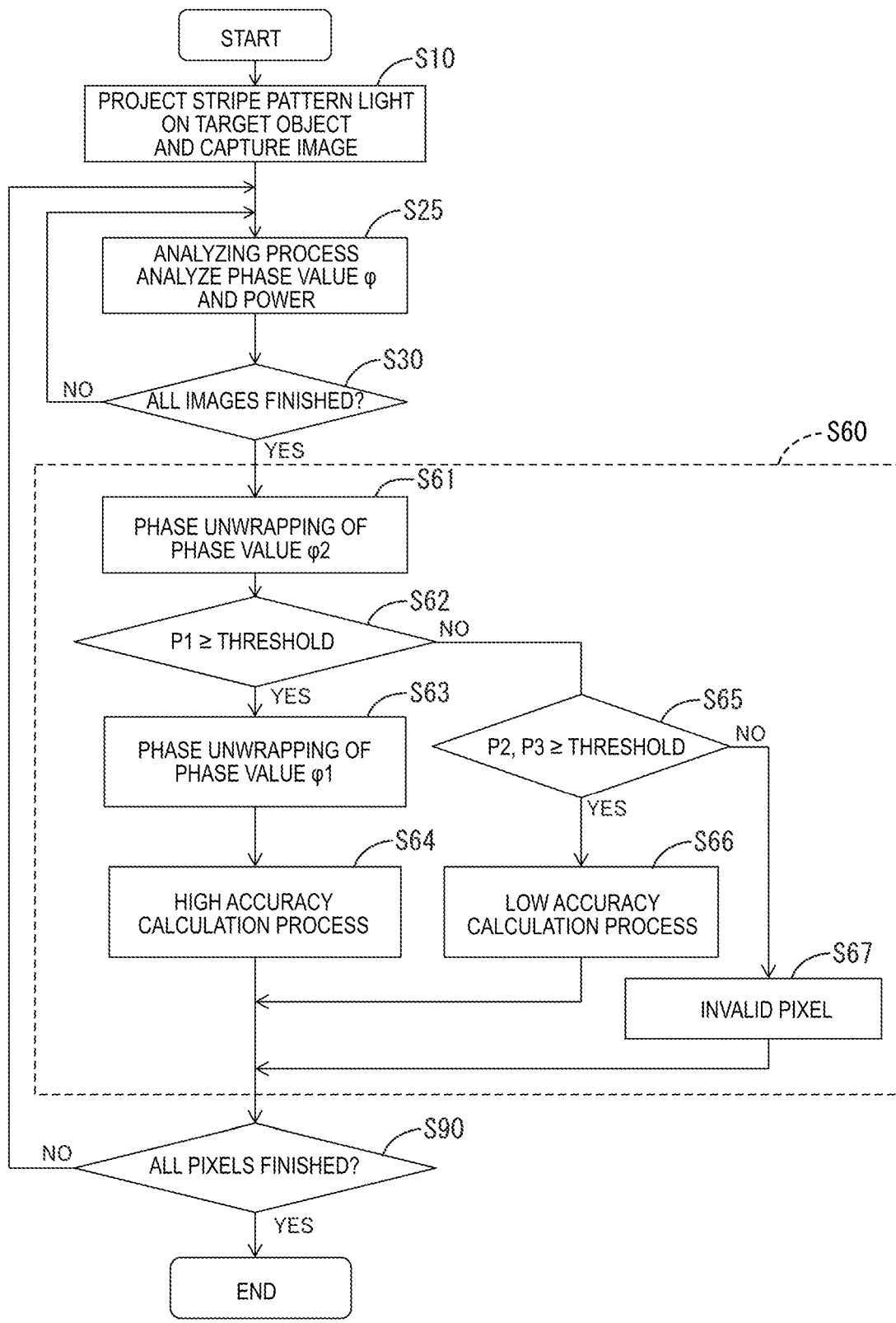
FIG. 13 illustrates a calculation sequence.

FIG. 13 is a flowchart of a measurement sequence. The calculation sequence according to a third embodiment includes five steps S10, S25, S30, S60, and S90 and differs from the calculation sequence according to the first embodiment in the calculation processes of steps S25 and S60.

In step S10, similar to the processes in the first embodiment, the projector 2 projects the three types of stripe pattern lights L1-L3 on the target object M and the camera 3 captures the images of the lights. Then, the analyzing process is performed in step S25. In the analyzing process, for the images G of the stripe pattern lights L1-L3, power P of the luminance I is analyzed in addition to the analysis of the phase value φ related to the luminance I. The power P is calculated by the formula 4.

Hereinafter, the power of the luminance I of the first stripe pattern light L1 is defined as P1. The power of the luminance I of the second stripe pattern light L2 is defined as P2 and the power of the luminance I of the third stripe pattern light L3 is defined as P3. If the analyzing process is finished, the process proceeds to step S50 and the calculation process is performed.

The calculation process of step S60 includes seven steps S61-S67. In step S61, the calculation device 7 performs the phase unwrapping of the second phase value φ2 with using the second phase value φ2 and the third phase value φ3 out of the three phase values φ1-φ3.

In step S62, the calculation device 7 compares the power P1 with a luminance threshold $P_O$ and determines whether the power P1 is equal to or greater than the luminance threshold $P_O$. The luminance threshold $P_O$ is a smallest value of the power that is necessary to keep the measurement accuracy.

If the power P1 is equal to or greater than the luminance threshold $P_O$, the process proceeds to step S63. In step S63, the calculation device 7 performs the phase unwrapping of the first phase value φ1 with using the second phase value φ2 that is obtained via the phase unwrapping in step S61. Then, the process proceeds to step S64.

In step S64, the calculation device 7 performs the high accuracy calculation process. In the high accuracy calculation process, the height $H_1(φ)$ of the target object M is calculated based on the first phase value (φ'1 obtained via the phase unwrapping.

If the power P1 is smaller than the luminance threshold $P_O$ (S62: NO), the process proceeds to step S65. In step S65, the calculation device 7 compares each of the power P2 and the power P3 with the luminance threshold $P_O$ and determines whether each of the power P2 and the power P3 is equal to or greater than the luminance threshold $P_O$.

If the power P2 and the power P3 are equal to or greater than the luminance threshold $P_O$ (S65: YES), the process proceeds to step S66. In step S66, the low accuracy calculation process is performed. In the low accuracy calculation process, the height $H_2(φ)$ of the target object M is calculated based on the second phase value φ'2 obtained via the phase unwrapping.

If at least one of the power P2 and the power P3 is smaller than the luminance threshold $P_O$ (S65: NO), the process proceeds to step S67 and the pixel Ps is processed as an invalid pixel Ps.

Then, in step S90, it is determined whether the analyzing is finished for all the pixels Ps. If the analyzing is not finished for all the pixels Ps, the process moves back to step S20 and the next pixel Ps is extracted and the analyzing process is performed to analyze the phase value φ and the power P.

Such processes are performed for every pixel Ps and heights H(φ) are estimated at all the target points. Then, it is determined YES in step S90 and a series of processes is terminated.

Similar to the first embodiment, the calculation process S60 according to the third embodiment includes the high accuracy calculation process S64 and the low accuracy calculation process S66. The high accuracy calculation process S64 is performed for the range near the focal plane surface F (the small depth range) and the height $H_1(φ)$ with a high accuracy is obtained. The low accuracy calculation process S64 is performed for the range far away from the focal plane surface F (the great depth range) and the height $H_2(φ)$ with a low accuracy is obtained. Accordingly, the height H(φ) of the target object M in the range far away from the focal plane surface F (the great depth range) can be calculated and also the height H(φ) of the target object M in the range near the focal plane surface F (the small depth range) can be calculated with a high accuracy.

The embodiments are described in detail; however, the embodiments are examples and do not limit the technical scope of the technology. The technical scope of the technology may include various modifications and alternations of the embodiments.

Figure 14:
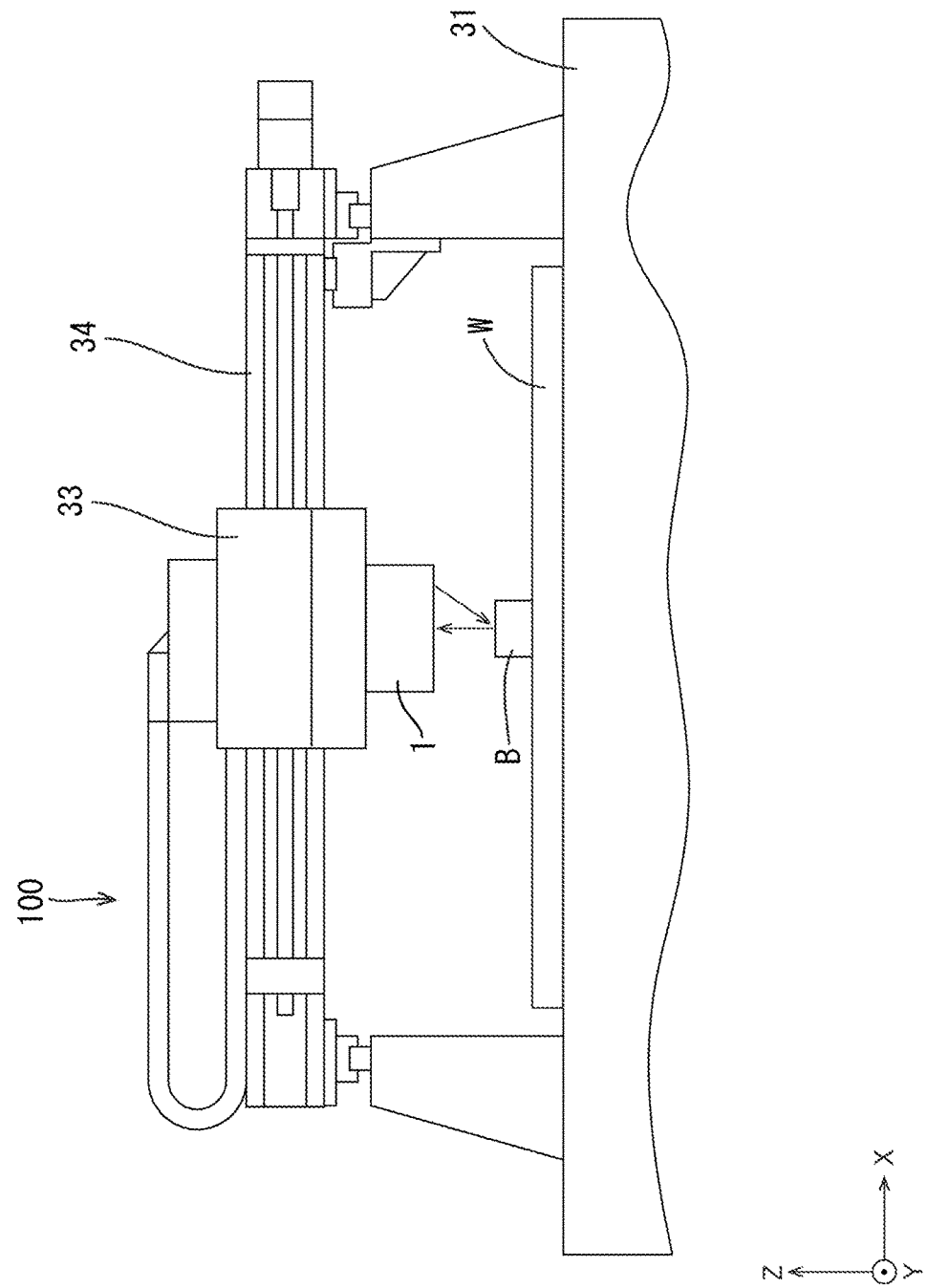
FIG. 14 is an elevated view of an inspection device.

(1) In the first embodiment, the measuring device 1 is included in the surface mounter 11. The measuring device 1 may be included in an inspection device 100. The inspection device 100 may be installed in a printed circuit board manufacturing line. As illustrated in FIG. 14, the inspection device 100 may include the stage 31, the head unit 33, and the driving unit 34 that moves the head unit 33 in two axial directions (the X-Y direction) on the stage 31. The measuring device 1 may be included in the head unit 33. The measuring device 1 included in the head unit 33 may capture an image of the printed circuit board W and inspect a height of the electronic component B mounted on the printed circuit board W. The measuring device 1 may measure heights of portions of the printed circuit board W and check the warping of the board W. The measuring device 1 may not be necessarily included in the surface mounter 11 or the inspection device 100 but may be used as an independent component.

(2) In the first embodiment, the sinusoidal wave is used as an example of the stripe pattern light; however, the stripe pattern light may not necessarily be a sinusoidal wave but may be any waves as long as the stripe pattern light has lightness that periodically changes. For example, the stripe pattern light may have a sawtooth wave.

(3) In the first to third embodiments, the phase unwrapping of the second phase value φ2 is performed based on the phase difference Δ between the second phase value φ2 and the third phase value φ3. Furthermore, the phase unwrapping of the first phase value φ1 is performed based on the phase value φ'2 obtained via the phase unwrapping. In the high accuracy calculation process, the height $H_1(\varphi)$ of the target object M is estimated based on the first phase value φ'1 obtained via the phase unwrapping. The high accuracy calculation process may be performed with any methods as long as the height $H_1(\varphi)$ of the target object M is estimated based on three phase values φ1-φ3.

(4) In the first to third embodiments, the phase unwrapping of the second phase value φ2 is performed based on the phase difference Δ between the second phase value φ2 and the third phase value φ3. In the low accuracy calculation process, the height $H_2(\varphi)$ of the target object M is estimated based on the second phase value φ2 obtained via the phase unwrapping. The low accuracy calculation process may be performed with any methods as long as the height $H_2(\varphi)$ of the target object M is estimated based on two phase values φ2 and φ3.

(5) In the first to third embodiments, the phase unwrapping of the second phase value φ2 is performed based on the phase difference Δ between the second phase value φ2 and the third phase value φ3. In the low accuracy calculation process, the height $H_2(\varphi)$ of the target object M is estimated based on the second phase value φ2 obtained via the phase unwrapping. Other than such a method, the phase unwrapping of the third phase value φ3 may be performed based on the phase difference Δ. In the low accuracy calculation process, the height $H_2(\varphi)$ of the target object M may be estimated based on the third phase value φ'3 obtained via the phase unwrapping. $H_2(\varphi)$ is a measurement value of the resolution.

What is claimed is:

1. A measuring device comprising:
 a projector configured to project, on a target object, first stripe pattern light having a first period, second stripe pattern light having a second period, and third stripe pattern light having a third period, a relation of the periods is the first period<the second period<the third period, wherein a ratio of the second period to the first period is greater than a ratio of the third period to the second period,
 a camera configured to capture an image of the first stripe pattern light, an image of the second stripe pattern light, and an image of the third stripe pattern light, each of which is projected on the target object, and
 a processor configured to perform phase analysis of luminance with a phase shifting method for the image of the first stripe pattern light, the image of the second stripe pattern light, and the image of the third stripe pattern light each of which is captured by the camera and calculate a height of the target object based on obtained phase analysis results.

2. The measuring device according to claim 1, wherein the processor is configured to calculate the height of the target object with using a first phase value obtained from the phase analysis of luminance related to the captured image of the first stripe pattern light, a second phase value obtained from the phase analysis of luminance related to the captured image of the second stripe pattern light, and a third phase value obtained from the phase analysis of luminance related to the captured image of the third stripe pattern light, when accuracy in calculation of the height of the target object is high, and the processor is configured to calculate the height of the target object with using the second phase value obtained from the phase analysis of luminance related to the captured image of the second stripe pattern light and the third phase value obtained from the phase analysis of luminance related to the captured image of the third stripe pattern light, when accuracy in calculation of the height of the target object is low.

3. The measuring device according to claim 2, wherein when the accuracy in calculation of the height of the target object is high, the processor is configured to perform phase unwrapping of the first phase value with reference to a phase difference between the second phase value and the third phase value and calculate the height of the target object based on the first phase value obtained via the phase unwrapping.

4. The measuring device according to claim 3, wherein when the accuracy in calculation of the height of the target object is low, the processor is configured to perform phase unwrapping of the second phase value or the third phase value with reference to a phase difference between the second phase value and the third phase value and calculate the height of the target object based on the second phase value or the third phase value obtained via the phase unwrapping.

5. The measuring device according to claim 3, wherein when the first period is defined as T1, the second period is defined as T2, and the third period is defined as T3, 2×T1<T2, T2<T3<1.5×T2.

6. The measuring device according to claim 3, wherein the processor is configured to determine the accuracy in calculation of the height of the target object between the high accuracy and the low accuracy based on the analysis result related to the captured image of the second stripe pattern light and the captured image of the third stripe pattern light.

7. The measuring device according to claim 3, wherein when the processor selects the low accuracy and calculates the height of the target object with using the second phase value and the third phase value and a calculated height of the target object is equal to or smaller than a height threshold, the calculation device is configured to select the high accuracy and calculate the height of the target object with using the first phase value, the second phase value, and the third phase value.

8. The measuring device according to claim 3, wherein the processor is configured to perform the phase unwrapping of the second phase value or the third phase value with using a phase difference between the second phase value and the third phase value, when the second phase value obtained via the phase unwrapping or the third phase value obtained via the phase unwrapping is equal to or smaller than a phase threshold, the processor is configured to select the high accuracy and calculate the height of the target object with using the first phase value, the second phase value, and the third phase value, and when the second phase value obtained via the phase unwrapping or the third phase value obtained via the phase unwrapping is greater than the phase threshold, the processor is configured to select the low accuracy and calculate the height of the target object with using the second phase value and the third phase value.

9. The measuring device according to claim 3, wherein the processor is configured to analyze power of luminance for each of the image of the first stripe pattern, the image of the second stripe pattern light, and the image of the third stripe pattern light that are captured by the camera, in addition to the phase analysis, and when the power of luminance of the captured image of the first stripe pattern light is equal to or greater than a luminance threshold, the processor is configured to calculate the height of the target object with using the first phase value, the second phase value, and the third phase value.

10. The measuring device according to claim 2, wherein when the accuracy in calculation of the height of the target object is low, the processor is configured to perform phase unwrapping of the second phase value or the third phase value with reference to a phase difference between the second phase value and the third phase value and calculate the height of the target object based on the second phase value or the third phase value obtained via the phase unwrapping.

11. The measuring device according to claim 2, wherein when the first period is defined as T1, the second period is defined as T2, and the third period is defined as T3, $2 \times T1 \leq T2$, $T2 < T3 < 1.5 \times T2$.

12. The measuring device according to claim 2, wherein the processor is configured to determine the accuracy in calculation of the height of the target object between the high accuracy and the low accuracy based on the analysis result related to the captured image of the second stripe pattern light and the captured image of the third stripe pattern light.

13. The measuring device according to claim 2, wherein when the processor selects the low accuracy and calculates the height of the target object with using the second phase value and the third phase value and a calculated height of the target object is equal to or smaller than a height threshold, the calculation device is configured to select the high accuracy and calculate the height of the target object with using the first phase value, the second phase value, and the third phase value.

14. The measuring device according to claim 2, wherein the processor is configured to perform phase unwrapping of the second phase value or the third phase value with using a phase difference between the second phase value and the third phase value, when the second phase value obtained via the phase unwrapping or the third phase value obtained via the phase unwrapping is equal to or smaller than a phase threshold, the processor is configured to select the high accuracy and calculate the height of the target object with using the first phase value, the second phase value, and the third phase value, and when the second phase value obtained via the phase unwrapping or the third phase value obtained via the phase unwrapping is greater than the phase threshold, the processor is configured to select the low accuracy and calculate the height of the target object with using the second phase value and the third phase value.

15. The measuring device according to claim 2, wherein the processor is configured to analyze power of luminance for each of the image of the first stripe pattern, the image of the second stripe pattern light, and the image of the third stripe pattern light that are captured by the camera, in addition to the phase analysis, and when the power of luminance of the captured image of the first stripe pattern light is equal to or greater than a luminance threshold, the processor is configured to calculate the height of the target object with using the first phase value, the second phase value, and the third phase value.

16. The measuring device according to claim 15, wherein when the power of luminance of the captured image of the first stripe pattern light is smaller than the luminance threshold, the processor is configured to compare each of the powers of luminance of the two captured images of the second stripe pattern light and the third stripe pattern light with the luminance threshold, and when the powers of two captured images are equal to or greater than the luminance threshold, the processor is configured to select the low accuracy and is configured to calculate the height of the target object with using the second phase value and the third phase value.

17. A surface mounter comprising:
the measuring device according to claim 1.

18. An inspection device comprising:
the measuring device according to claim 1.

19. A measuring device comprising:
a projector configured to project, on a target object, first stripe pattern light having a first period, second stripe pattern light having a second period, and third stripe pattern light having a third period, a relation of the periods is the first period<the second period<the third period, a camera configured to capture an image of the first stripe pattern light, an image of the second stripe pattern light, and an image of the third stripe pattern light, each of which is projected on the target object, and a processor configured to perform phase analysis of luminance with a phase shifting method for the image of the first stripe pattern light, the image of the second stripe pattern light, and the image of the third stripe pattern light each of which is captured by the camera and calculate a height of the target object based on obtained phase analysis results, wherein the processor is configured to calculate the height of the target object based on phase values selected based on an accuracy of a calculation process.

20. A measuring device comprising:
a projector configured to project, on a target object, first stripe pattern light having a first period, second stripe pattern light having a second period, and third stripe pattern light having a third period, a relation of the periods is the first period<the second period<the third period, a camera configured to capture an image of the first stripe pattern light, an image of the second stripe pattern light, and an image of the third stripe pattern light, each of which is projected on the target object, and a processor configured to perform phase analysis of luminance with a phase shifting method for the image of the first stripe pattern light, the image of the second stripe pattern light, and the image of the third stripe pattern light each of which is captured by the camera and calculate a height of the target object based on obtained phase analysis results, wherein the processor is configured to calculate the height of the target object with using a first phase value obtained from the phase analysis of luminance related to the captured image of the first stripe pattern light, a second phase value obtained from the phase analysis of luminance related to the captured image of the second stripe pattern light, and a third phase value obtained from the phase analysis of luminance related to the captured image of the third stripe pattern light, when accuracy in calculation of the height of the target object is high, and the processor is configured to calculate the height of the target object with using the second phase value obtained from the phase analysis of luminance related to the captured image of the second stripe pattern light and the third phase value obtained from the phase analysis of luminance related to the captured image of the third stripe pattern light, when accuracy in calculation of the height of the target object is low.

* * * * *